(12) United States Patent
Uekama et al.

(10) Patent No.: US 7,689,131 B2
(45) Date of Patent: Mar. 30, 2010

(54) WDM SYSTEM

(75) Inventors: Kimio Uekama, Kawasaki (JP);
Takehiro Fujita, Kawasaki (JP);
Motoyoshi Sekiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 591 days.

(21) Appl. No.: 10/570,840

(22) PCT Filed: Nov. 11, 2003

(86) PCT No.: PCT/JP03/14328

§ 371 (c)(1),
(2), (4) Date: Mar. 3, 2006

(87) PCT Pub. No.: WO2005/046092

PCT Pub. Date: May 19, 2005

(65) Prior Publication Data

US 2006/0285846 A1 Dec. 21, 2006

(51) Int. Cl.
*H04B 10/02* (2006.01)
(52) U.S. Cl. .................. 398/181; 398/177; 398/33; 398/38; 398/30; 359/333; 359/337; 359/341.4
(58) Field of Classification Search ............... 398/177, 398/174, 181, 141, 158, 159, 147, 81, 79, 398/160, 161, 157, 148, 149, 33, 30, 31, 398/34, 37, 38, 173, 180, 178, 83, 26, 93, 398/94; 359/341, 337, 333, 349, 341.4
See application file for complete search history.

(56) References Cited

U.S. PATENT DOCUMENTS 6,466,348 B1   10/2002   Izumi 6,718,141 B1*   4/2004   deVette ................ 398/82
7,113,700 B2*   9/2006   Shimizu et al. ........... 398/33
7,139,484 B2*  11/2006   Kurumida et al. ......... 398/83

FOREIGN PATENT DOCUMENTS

JP   0 853 394   7/1998

(Continued)

OTHER PUBLICATIONS

International Search Report dated Jan. 13, 2004.

(Continued)

*Primary Examiner*—Hanh Phan
(74) *Attorney, Agent, or Firm*—Fujitsu Patent Center

(57) ABSTRACT

A WDM system includes a plurality of P to P WDM systems connected for wavelength-multiplexing optical signals of a plurality of wavelengths, transmitting them to a transmission path, transmitting wavelength-division multiplexed light while performing amplification by using optical AMP in the transmission path, and subjecting the wavelength-division multiplexed light to wavelength isolation at the reception side. An OSC which is a monitoring control signal such as a normal optical signal is used closely within one P to P WDM system. However, by transmitting and receiving the OSC between a plurality of P to P WDM systems, it is possible to solve a problem at the system rise. Moreover, since accumulative OSNR data is transmitted up to the P to P WDM system of the final stage, it is possible to detect an accurate OSNR value and a leak ASE light quantity at the end side.

17 Claims, 16 Drawing Sheets

FOREIGN PATENT DOCUMENTS

| | | |
|---|---|---|
| JP | 10-200489 | 7/1998 |
| JP | 11-261490 | 9/1999 |
| JP | 2000-232433 | 8/2000 |
| JP | 2003-298531 | 10/2003 |
| JP | 2003-298531 A | 10/2003 |

OTHER PUBLICATIONS

Japanese Office Action mailed Sep. 30, 2008 for corresponding Japanese Application 2005-510460 (Partial English-language translation provided).

* cited by examiner

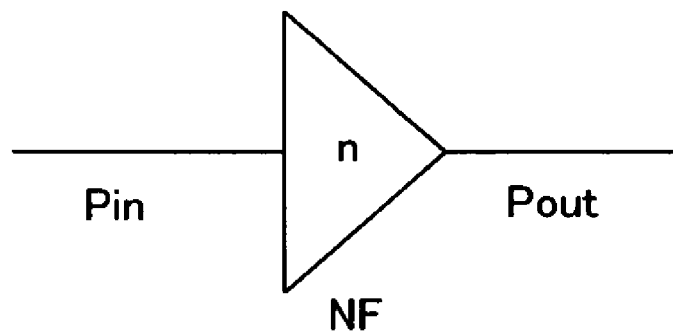
F I G. 1 1 A
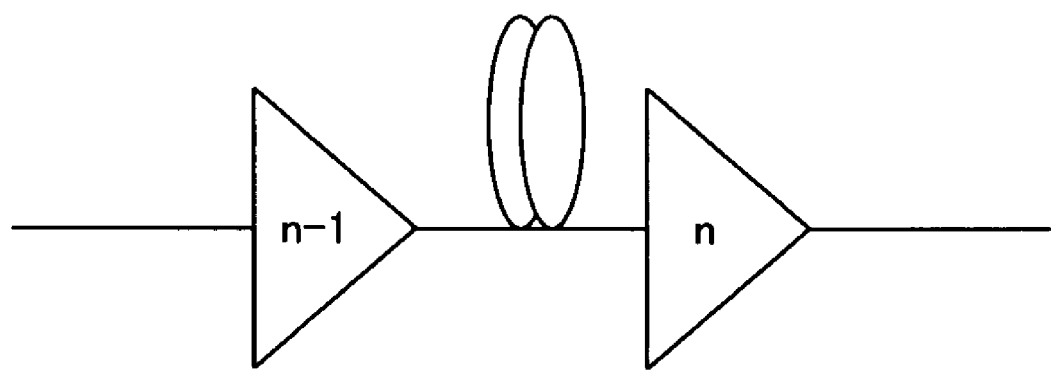
F I G. 1 1 B

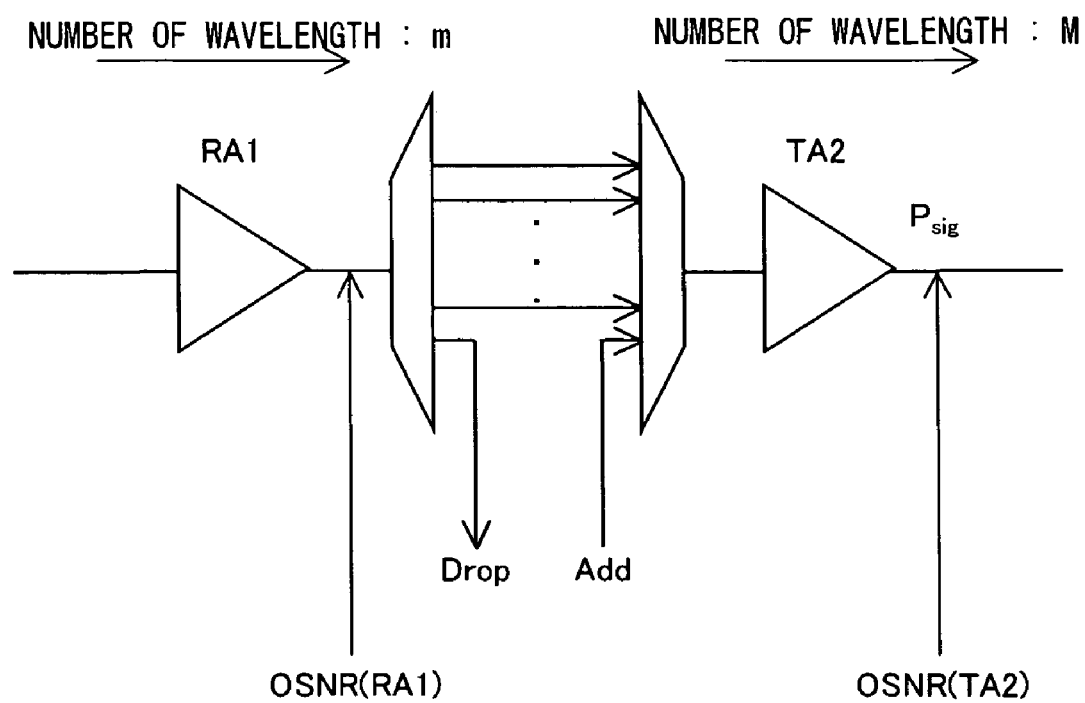
F I G. 1 2

FIG. 13

| | | | | Multi-EWCF | | Multi-EWCS | | Multi-OCH | | Multi-WCS |
|---|---|---|---|---|---|---|---|---|---|---|
| 1 | F | | | EWCF01 (01-08) | | EWCS01 (01-08) | | OSNR_cum01-08 | | Reserve |
| 2 | J0 | | | EWCF02 (09-16) | | EWCS02 (09-16) | | OSNR_cum09-16 | | Reserve |
| 3 | E1#1 | | | EWCF03 (17-24) | | EWCS03 (17-24) | | OSNR_cum17-24 | | Reserve |
| 4 | E1#2 | | | EWCF04 (25-32) | | EWCS04 (25-32) | | OSNR_cum25-32 | | Reserve |
| 5 | F1 | | | EWCF05 (33-40) | | EWCS05 (33-40) | | OSNR_cum33-40 | | WCS01 (01-08) |
| 6 | D1 | | | EWCF06 (41-48) | | EWCS06 (41-48) | | OSNR_cum41-48 | | WCS02 (09-16) |
| 7 | D2 | | | EWCF07 (49-56) | | EWCS07 (49-56) | | OSNR_cum49-56 | | WCS03 (17-24) |
| 8 | D3 | | | EWCF08 (57-63) | | EWCS08 (57-63) | | OSNR_cum57-64 | | WCS04 (25-32) |
| 9 | R0 | | | EWCF09 (64-72) | | EWCS09 (64-72) | | OSNR_cum65-72 | | Reserve |
| 10 | WCx-AIS | | | EWCF10 (73-80) | | EWCS10 (73-80) | | OSNR_cum73-80 | | Reserve |
| 11 | FDi | | | EWCF11 (81-88) | | EWCS11 (81-88) | | OSNR_cum81-88 | | Reserve |
| 12 | E2 | | | Reserve | | Reserve | | OSNR_to01-08 | | Reserve |
| 13 | RDi | | | Reserve | | Reserve | | OSNR_to09-16 | | Reserve |
| 14 | WCF1 | | | Reserve | | Reserve | | OSNR_to17-24 | | Reserve |
| 15 | WCF2 | | | Reserve | | Reserve | | OSNR_to25-32 | | Reserve |
| 16 | WCF3 | | | Reserve | | Reserve | | OSNR_to33-40 | | Reserve |
| 17 | WCF4 | | | Reserve | | Reserve | | OSNR_to41-48 | | Reserve |
| 18 | K1#1 | | | Reserve | | Reserve | | OSNR_to49-56 | | Reserve |
| 19 | K1#2 | | | Reserve | | Reserve | | OSNR_to57-64 | | Reserve |
| 20 | R1 | | | Reserve | | Reserve | | OSNR_to65-72 | | ASE-1 |
| 21 | Multi-EWCF | | | Reserve | | Reserve | | OSNR_to73-80 | | ASE-2 |
| 22 | Multi-EWCS | | | Reserve | | Reserve | | OSNR_to81-88 | | EDFA Pow-1 |
| 23 | Multi-OCH | | | Reserve | | Reserve | | Reserve | | EDFA Pow-2 |
| 24 | Multi-WCS | | | | | | | | | |
| | BiP-8 | | | | | | | | | |

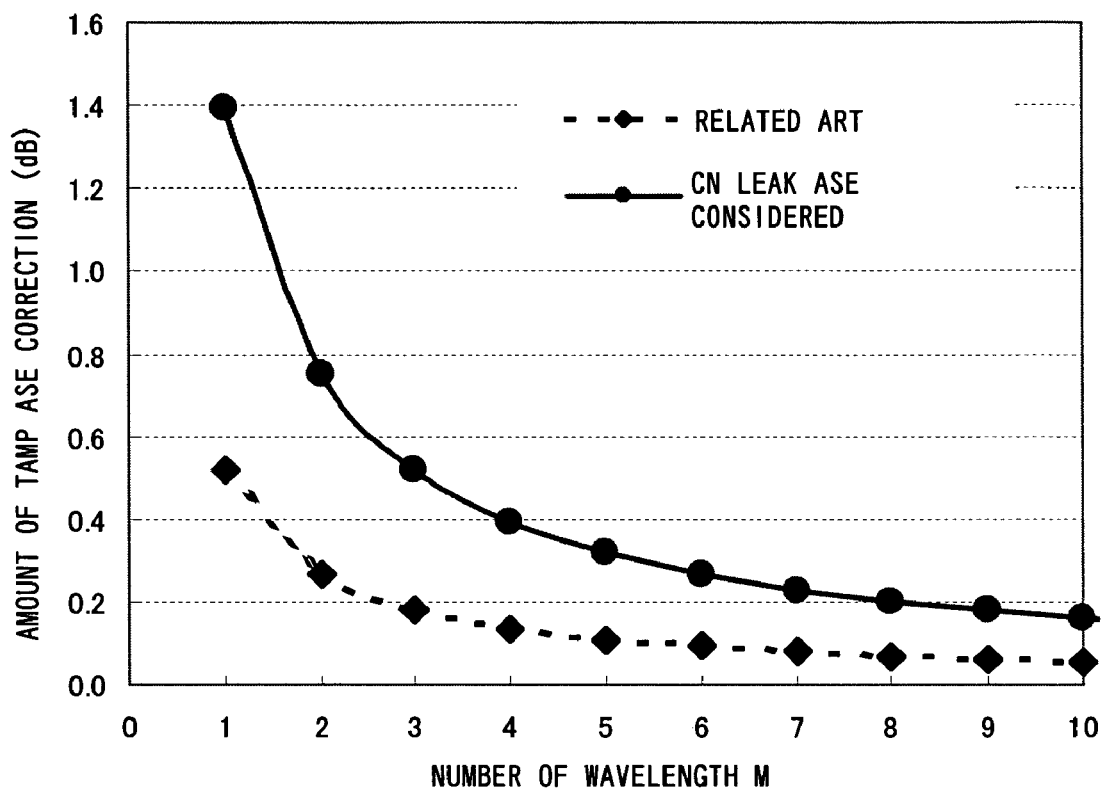
| | |
|---|---|
| OUTPUT END OF RECEPTION AMPLIFIER OSNR | 16.0 dB |
| OUTPUT END OF TRANSMISSION AMPLIFIER OSNR | 34.9 dB |
| AMPLIFIER ASE BAND WIDTH | 40 nm |
| WAVELENGTH MULTIPLEXER/DEMULTIPLEXER PASSBAND WIDTH | 1.0 nm |
| NUMBER OF WAVELENGTH THROUGH COMPENSATION NODE | 1 WAVE |
F I G. 1 6

WDM SYSTEM

CROSS-REFERENCE TO RELATED APPLICATIONS

This application is a National Phase of International Application PCT/JP2003/14328, filed on Nov. 11, 2003, now pending, the contents of which are herein wholly incorporated by reference.

BACKGROUND OF THE INVENTION

1. Field of the Invention

The present invention relates to a WDM system.

2. Description of the Related Arts

Recently, with an increasing amount of traffic, wavelength-division multiplexing (WDM) system devices have been widely adopted, and a P to P WDM system including a amplifier/repeater (AMP) of several spans as a basic configuration is used.

In addition to the conventional configuration, a long distance transmission, an optical add/drop function, and an optical cross-connect system are requested as new functions. To realize these requests, a compensation node (CN) in which a combination of a demultiplexing unit and a multiplexing unit is provided in a plurality of P to P WDM systems.

FIG. 1 shows a conventional P to P WDM system.

In FIG. 1, "VAT" is short for "variable attenuator", "SAU" is short for "spectrum analyzer", "TA" is short for "transmission amplifier", "LA" is short for "in-line amplifier", "RA" is short for "reception amplifier", "OSC" is short for "optical supervisory channel", "MUX" is short for "multiplexer", "DMUX" is short for "demultiplexer", "E/O" is short for "electro-optic transducer", "O/E" is short for "opto-electronic transducer", "TERM" is short for "terminal station", and "ILA" is short for "inline amplifier".

The transmission terminal station TERM 1 is first described below. When the optical signals of the wavelengths 1 through n are output from the E/O, the optical level of the optical signal of each wavelength is adjusted by the variable attenuator VAT, and input to a multiplexer MUX 1. The multiplexer MUX 1 wavelength-multiplexes the optical signal of each wavelength, generates wavelength-division multiplexed light, and inputs the wavelength-division multiplexed light to a transmission amplifier TA 1. The wavelength-division multiplexed light amplified by the transmission amplifier TA 1 is transmitted to the transmission path. A part of the light is branched and input to a spectrum analyzer SAU. Then, the spectrum analyzer performs feedback controls on the variable attenuator VAT based on the result of the detection of the optical level of the optical signal of each wavelength, and the optical signal of each wavelength is transmitted at the same optical level.

A transmission path is provided with in-line amplifiers ILA 1, 2, and 3 at predetermined intervals, and a wavelength-division multiplexed light attenuated by the transmission through the transmission path is amplified, thereby realizing a long-distance transmission.

In a reception terminal station TERM 2, a reception amplifier RA 11 amplifies received wavelength-division multiplexed light, a demultiplexer wavelength-demultiplexes the light into optical signals of the respective wavelengths, and an opto-electronic transducer O/E transforms the signals into electric signals and receives them. The spectrum analyzer SAU analyzes the wavelength-division multiplexed light amplified by the reception amplifier RA 11, and the result is transmitted to the transmission side along an optical supervisory channel OSC.

With the configuration shown at the lower portion of FIG. 1, the transmission and reception sides are inverted as compared with the upper configuration, and the explanation is omitted here.

The E/O of each terminal station has the wavelengths of 1 through N available in the WDM system. The signal light of the E/O is wavelength-multiplexed by the MUX1 through the VAT prepared for each wavelength of the TERM1. A multiplexed optical signal is amplified by the transmission AMP (TA11). The output signal of the TA11 is monitored by the SAU, and the SAU issues a control signal to the VAT to allow the peak level of each wavelength to match a target level. Thus, the VAT controls the peak power of each wavelength.

The repeater AMPs (LA11, LA12, SA13) of the ILA1, ILA2, ILA3 amplify the signal light degraded in the transmission path are amplified.

The reception AMP (RA11) of TERM2 as a reception unit amplifies the signal light degraded in the transmission path. The amplified signal light is wavelength-demultiplexed by the DMUX1, and input to the O/E of each terminal station. The SAU in the TERM2 has the function of monitoring the output light of the reception AMP (RA11).

The OSC (optical supervisory channel) is used as a control signal among the WDM stations in the WDM system shown in FIG. 1. The control signal and a multiplexed signal have different wavelengths, and the control signal is multiplexed with a signal light wavelength-multiplexed by a coupler, and demultiplexed. In the transmission AMP (TA11), the signal is multiplexed with a WDM signal and transmitted downstream. In each repeater AMP (LA11, LA12, LA13), the signal is demultiplexed from the WDM signal, and terminated. The OSC signal is multiplexed with a WDM signal with necessary information added, and transmitted downstream. In the reception AMP (RA11), the signal is demultiplexed from the WDM signal, and terminated.

The system control data communicated with each WDM station in the OSC can be the setting information, status information and fault information about each wavelength of the TERM1, the status information and fault information about each AMP, and the status information about the OSC. According to the information, the rise of the system, the increase and decrease of a wavelength, the system during the fault of the system is controlled.

When a long-distance transmission is realized, and the number of spans is increased by increasing in-line amplifiers with the configuration shown in FIG. 1, the transmission degradation occurs by the accumulation of ASE light (natural noise light) generated by the AMP connected to a plurality of stages, the accumulation of tilt (wavelength dependence relating to the loss characteristic) among the wavelengths, etc. As a method of avoiding the transmission degradation due to those described above, there is a method of waveform-regenerating each wavelength light DMUXed by the P to P WDM system by a regenerator (REG) unit.

FIG. 2 shows the configuration of the WDM system using the REG unit.

In FIG. 2, only the difference from FIG. 1 is explained below.

Since the degradation by the ASE light accumulation, tilt accumulation, etc. can be all cancelled by adding the REG unit, the characteristic is not degraded and the long-distance transmission can be performed. However, since it is necessary to prepare a REG unit for each wavelength, a high cost is required.

As a method for simultaneously realizing the cancellation of the accumulation of the ASE light and the accumulation of the tilt and the deletion of the REG unit, a compensation node system for directly connecting the MUX and DEMUX sides of the P to P WDM system opposite to each other is adopted.

FIG. 3 shows the configuration of the compensation node system.

In FIG. 3, the compensation node is formed by the CN-T1, CN-R2, CN-T2, and CN-R1.

The long-distance WDM transmission system with the configuration of the compensation node shown in FIG. 3 has the following advantage when it is compared with the configuration of increasing the number of repeater AMPs (in-line AMP) shown in FIG. 1.

One is that the ASE light accumulated in each AMP at the left side of the compensation node is not transmitted to the right of the downstream compensation node by cutting off the ASE light out of the filter band width by the filter characteristic of the DMUX1 in the CN-R1 shown in FIG. 3.

By the control of the VAT unit of the CN-T1 shown in FIG. 3, the output of each wavelength in the output unit of the transmission AMP (TA21) of the CN-T1 is controlled to be kept at a constant level. Thus, the tilt accumulation generated in each AMP in the left WDM system of the compensation node can be canceled.

From the viewpoint of device control, the CN-R1 and CN-T1 shown in FIG. 3 do not communicate the OSC control information, and do not perform cooperative control between the compensation nodes in the left and right sections.

There are several problems about the long-distance WDM transmission using a compensation node by not communicating device management control information and the optical characteristic information between the devices spanning the compensation nodes.

First problem is that when a plurality of P to P WDM systems are connected using a compensation node, the fluctuation of the level of an upstream unit at the system rise and the addition of a wavelength is transmitted to a downstream unit because each channel of the upstream DMUX unit is directly connected to each channel of the downstream MUX unit. At the system rise and the addition of a wavelength from the upstream unit, there can be the case where an unstable status in which a downstream unit starts a rising operation occurs while the optical level of the upstream unit is gradually enhanced.

The second problem is that the OSNR value indicating the optical characteristic for use in discriminating the transmission path degradation in the WDM transmission path includes an error from a true OSNR value each time a compensation node is passed when a spectrum analyzer (SAU) in the device performs a monitoring process.

FIG. 4 is an explanatory view of the deviation of the OSNR value monitored by spanning compensation nodes from the true OSNR value.

Assume that the OSNR measured by the RA13 of the CN-R1 shown in FIG. 4 is S13, and a total value of the ASE light noise of the TA11, LA12, and Ra13 at the left side of the compensation node is N13. Then, assuming that the line width at the prescription of the OSNR is Δλ1, the ASE light out of the band width is removed, but the ASE light immediately below the signal light passes the DEMUX1 as is, and is accumulated as is in the wavelength of the right system of the compensation node. Assume that the OSNR read value when the SAU measures the OSNR in the right RA23 of the compensation node is S23, and the total value of the ASE light generated in the TA21, LA21, and RA21 to the right of the compensation node is N23. The apparent OSNR value read by the RA23 is S23, but actually the ASE light of N13 accumulated in the left system of the compensation node is also included in the signal light. Therefore, it is necessary to determine that the true OSNR value in the R23 is S23 or N13.

The third problem is that, when a plurality of P to P WDM systems are connected through compensation nodes, the ASE is independently corrected in the upstream WDM unit and the downstream WDM unit, but there arises an error in the amount of ASE correction of the downstream WDM unit by the ASE in the filter band passing as is after the passage through the filter of the upstream DMUX unit.

FIG. 5 is an explanatory view of the outline of the leakage ASE in a compensation node.

Assume that the OSNR measured by the RA13 of the CN-R1 shown in FIG. 5 is S13, and a total value of the ASE light noise of the TA11, LA12, and Ra13 at the left side of the compensation node is N13. Then, assume that the line width at the prescription of the OSNR is Δλ1, and the filter band width of the DMUX1 of the CN-R1 is Δλ2. The filter of the DMUX1 cuts off the ASE light out of the band of the Δλ2 in the wavelength demultiplexed by the DMUX1 of the CN-R1, but cannot cut off the ASE light in the band width, and it is transmitted as is to the MUX2 side of the right system of the compensation node.

In the left and right WDM sections of the compensation node, the ASE is corrected in order to keep constant signal light power per wavelength contained in the output signal of each AMP independent of the number of wavelengths. Refer to the patent document 1 for the detailed principle of the ASE correction.

In the long-distance WDM system with the configuration of the conventional compensation node shown in FIG. 3, it is considered that the ASE correction has been completed for each WDM section. However, the ASE light leaking through the CN-R1 is not actually corrected, thereby resulting in insufficient ASE correction.

The present invention aims at solving the above-mentioned problems, and improves the system performance by the long-distance WDM transmission system with the CN configuration by performing:

stabilizing the operation of system rise by mutual communication of device setting information in the CN section (between the CN-R and the CN-T) in the long-distance WDM system in a compensation node;

displaying an OSNR true value in each WDM section by transmitting the OSNR information for each wavelength in the CN section, and discriminating the waveform degradation in the WDM device in the long-distance WDM system in a compensation node; and optimizing the amount of ASE correction by calculating the amount of leakage ASE light for each wavelength in the CN section, and performing correction in the long-distance WDM system with the CN configuration.

Patent Document 1
Japanese Patent Application Publication No. 2000-232433

SUMMARY OF THE INVENTION

The present invention aims at improving the performance on the optical network system by controlling the device management control information and the optical characteristic information among a plurality of P to P wavelength-multiplexing systems interconnected through compensation nodes.

The WDM system according to the present invention is provided with plural series of optical systems having: a wavelength-multiplexing unit for wavelength-multiplexing the optical signals of a plurality of wavelengths; a transmission path having a plurality of repeater amplifiers for transmitting wavelength-division multiplexed light multiplexed by the wavelength-multiplexing unit; and a wavelength demultiplexing unit for wavelength-demultiplexing the transmitted wavelength-division multiplexed light. The system includes: a compensation node device which is provided at a connection portion constituted by a wavelength-multiplexing unit and a wavelength demultiplexing unit opposite to each other, and transfers an optical signal by carrying the information about the supervisory control signal of the optical system at the preceding stage with the supervisory control information about the optical system at the subsequent stage.

According to the present invention, by communicating the necessary supervisory control information among the optical systems which have not conventionally communicated supervisory control information, the problem generated in an optical system at a subsequent stage at the system rise can be solved, and the correct OSNR value and the amount of leakage ASE light can be calculated at the end side, thereby optimally adjusting the gain of the optical amplifier including the repeater amplifier.

BRIEF DESCRIPTION OF THE DRAWINGS

FIG. 11 is an explanatory view showing the method of calculating the OSNR of the amplifier;

FIG. 12 is an explanatory view showing the method of calculating the amount of the leakage ASE light in the compensation node;

FIG. 13 is an explanatory view of the data newly added in the OSC data format according to an embodiment of the present invention;

FIG. 16 shows the effect of correcting the leakage ASE light in a compensation node.

DESCRIPTION OF THE PREFERRED EMBODIMENTS

The first problem can be solved by mutually communicating by each WDM system through a compensation node the supervisory control information (OSC: optical supervisory channel) used in controlling each AMP in a plurality of P to P WDM systems connected through the compensation nodes.

Figure 6:
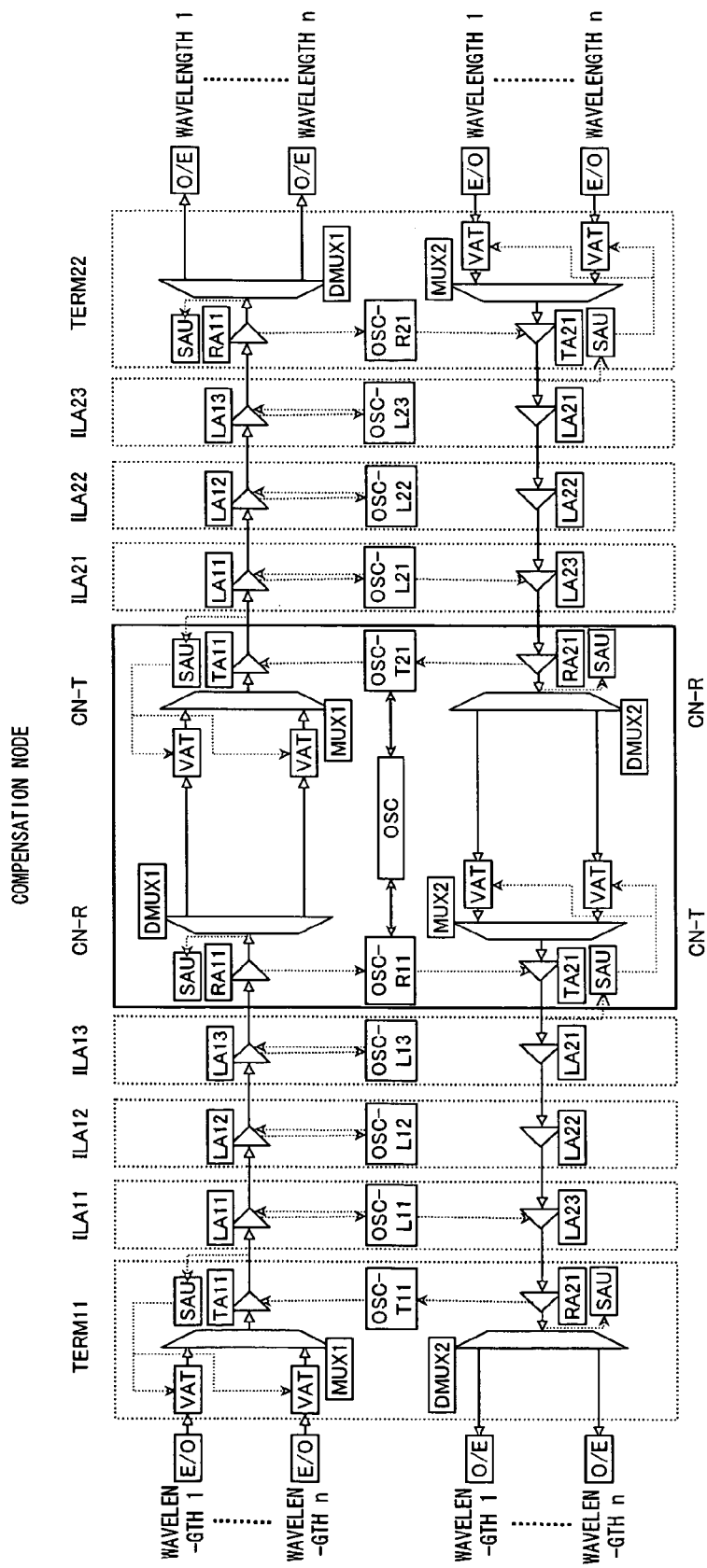
FIG. 6 shows the configuration of the WDM system according to an embodiment of the present invention.

FIG. 6 shows the configuration of the WDM system according to an embodiment of the present invention.

First, the procedure of activating the system in the WDM section is explained below.

In FIG. 6, when optical signals 1 through n of each wavelength are input to the VAT, the SAU detects that the light exceeding the VAT input threshold has entered, and the SAU directs the VAT to release the ATT. At this time, the transmission AMP starts amplification when input at a constant level is received. The operation at this time is referred to as "AGC (auto gain control)". When the amplification is performed up to an output target value depending on the number of wavelengths, the transmission AMP (TA11) stops the amplification, and control is passed to the operation of stabilizing the output level. The operation is referred to as an ALC (auto level control). Similarly, when a signal at a constant level is input, the repeater AMP (LA11 through LA13) and the reception AMP (RA11) amplify the signal up to the target output, and control is passed to the ALC operation.

Each AMP obtains the operation information about the AGC/ALC of the upstream AMP through the OSC. Each AMP obtains the ALC operation information from an upstream AMP, and transmits the ALC operation information to the next AMP when the operation of the AMP of the pertinent system becomes the ALC. Thus, when the reception AMP at the final stage enters the ALC operation, the ALC operation (stable operation) of the entire WDM section is finally determined.

Figure 7:
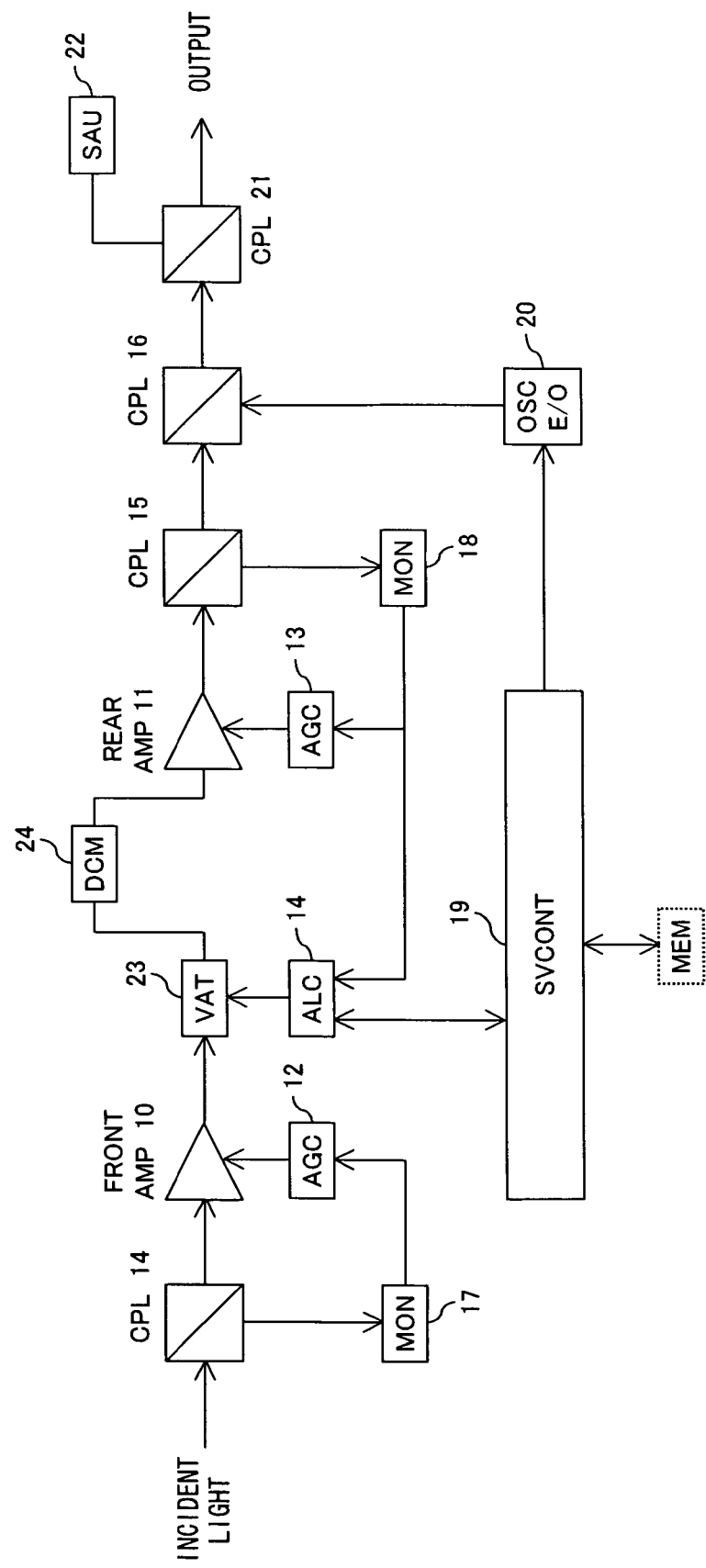
FIG. 7 is an explanatory view of the operation and structure of the transmission AMP.
Figure 8:
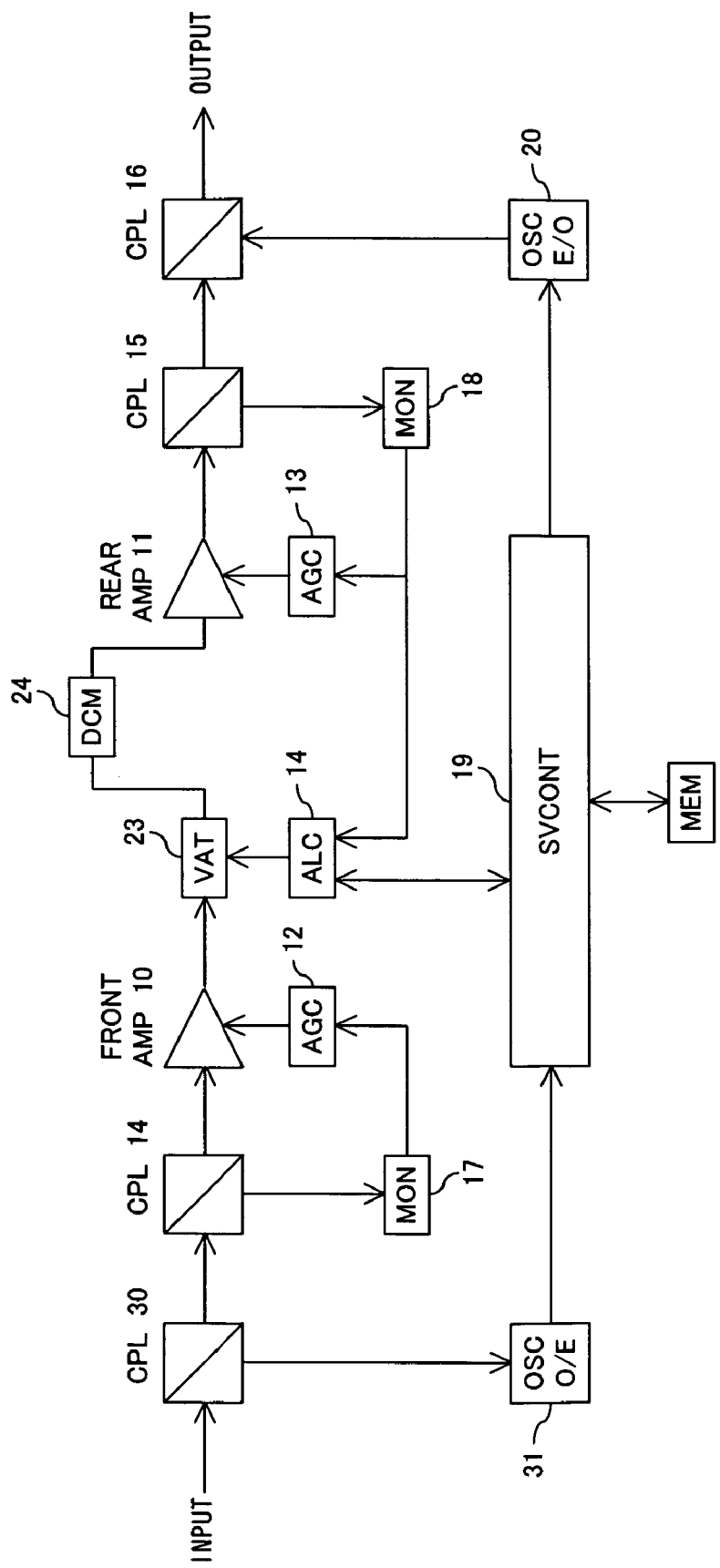
FIG. 8 is an explanatory view of the operation and structure of the repeater AMP.
Figure 9:
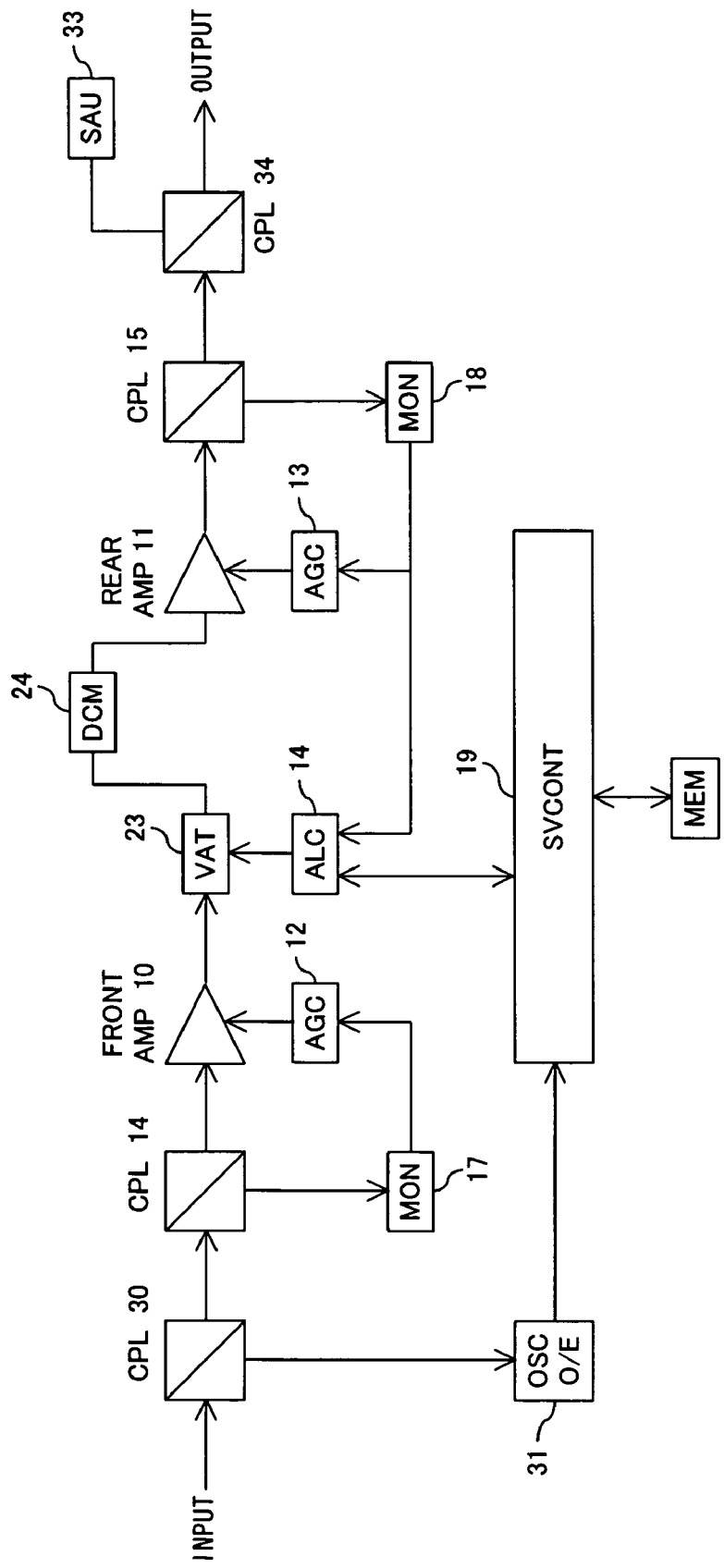
FIG. 9 is an explanatory view of the operation and structure of the reception AMP.

The operation and the structure of the transmission AMP, the repeater AMP, and the reception AMP are explained by referring to FIGS. 7 through 9.

FIG. 7 shows the structure of the transmission AMP.

When the incident light is input to a coupler CPL 14, a part of the light is input to a front amplifier 10, and the remainder is input to a monitor MON 17. Based on the optical level detected by the monitor MON 17, an AGC control unit 12 controls the front amplifier 10 for a constant gain. When the optical level is amplified, the light is input to an optical attenuator VAT 23, and the optical level is adjusted. The light output from the optical attenuator VAT 23 is dispersion-compensated by a dispersion compensation fiber DCM 24, and then amplified by a rear amplifier 11. The light output from the rear amplifier 11 is branched by a coupler CPL 15, a part of the light is input to a monitor MON 18, and the optical level is detected. The result is input to an AGC control unit 13 and the an ALC control unit 14, the AGC control unit 13 controls the rear amplifier 11 for constant gain, and the ALC control unit 14 controls the optical attenuator VAT. The ALC control unit 14 adjusts the ALC control also according to an instruction from a supervisory control unit SVCONT 19. The light that has passed through the coupler CPL 15 is input to a coupler CPL 16. In this process, a supervisory control signal output from the supervisory control unit SVCONT 19 generated as an optical signal by an electro-optic transducer OSC E/O 20 is wavelength-multiplexed, and the memory MEM stores data required when the supervisory control unit SVCONT 19 issues an instruction. The output of the coupler CPL 16 is input to a coupler CPL 21. A part of the output is input to a spectrum analyzer 22, and the remainder is output to a transmission path.

FIG. 8 is an explanatory view of the configuration of the repeater AMP (in-line amplifier).

In FIG. 8, the same component as the transmission AMP is assigned the same reference numeral, and the explanation is omitted here.

The repeater AMP is different from the transmission AMP in that the input is branched by a coupler CPL 30, the optical supervisory channel OSC is received by an opto-electronic transducer OSC O/E 31, and the information is passed to the supervisory control unit SVCONT 19. With the configuration above, the supervisory control unit SVCONT 19 issues an instruction to the ALC control unit 14, and outputs a new supervisory control signal from the coupler CPL 16 through the electro-optic transducer OSC E/O 20. The repeater AMP does not detect the spectrum of the optical signal by the spectrum analyzer.

FIG. 9 is an explanatory view of the configuration of the reception AMP.

In FIG. 9, the same component as in FIGS. 7 and 8 is assigned the same reference numeral, and the explanation is omitted here.

In the reception AMP, the received optical signal is demultiplexed by the coupler CPL 30 and received by the opto-electronic transducer OSC O/E 31, and the information is passed to the supervisory control unit SVCONT 19. The output of the coupler CPL 15 is provided with a coupler CPL 34 and a spectrum analyzer 33, and the transmission quality of the optical signal at a reception end is detected.

The above-mentioned problems are also detected when wavelength expansion is performed. When the transmission AMP perform the wavelength expansion, the transmission AMP passes control from the ALC operation to the AGC operation. When the AGC operation is performed until an output target value is obtained depending on the number of wavelengths after the expansion, and when the target value is reached, control is passed to the ALC operation. The repeater AMP and the reception AMP similarly perform the ALC→AGC→ALC operations.

Similarly in the wavelength expansion, the AGC/ALC information in the WDM section is transmitted through the OSC, and the final stable status of the AMP can be confirmed by the reception AMP at the final stage.

In the conventional long-distance transmission system for connecting a plurality of WDM systems using a compensation node, no information is communicated between the CN-R and the CN-T in the compensation node, and there is the possibility that a downstream CN-T can be activated during the rise of an upstream WDM system, thereby causing an unstable status. In the embodiment of the present invention, the rise of the downstream system can be stabilized by passing the information about the completion of the normal rise of the upstream WDM system between the CN-R and the CN-T.

Figure 10:
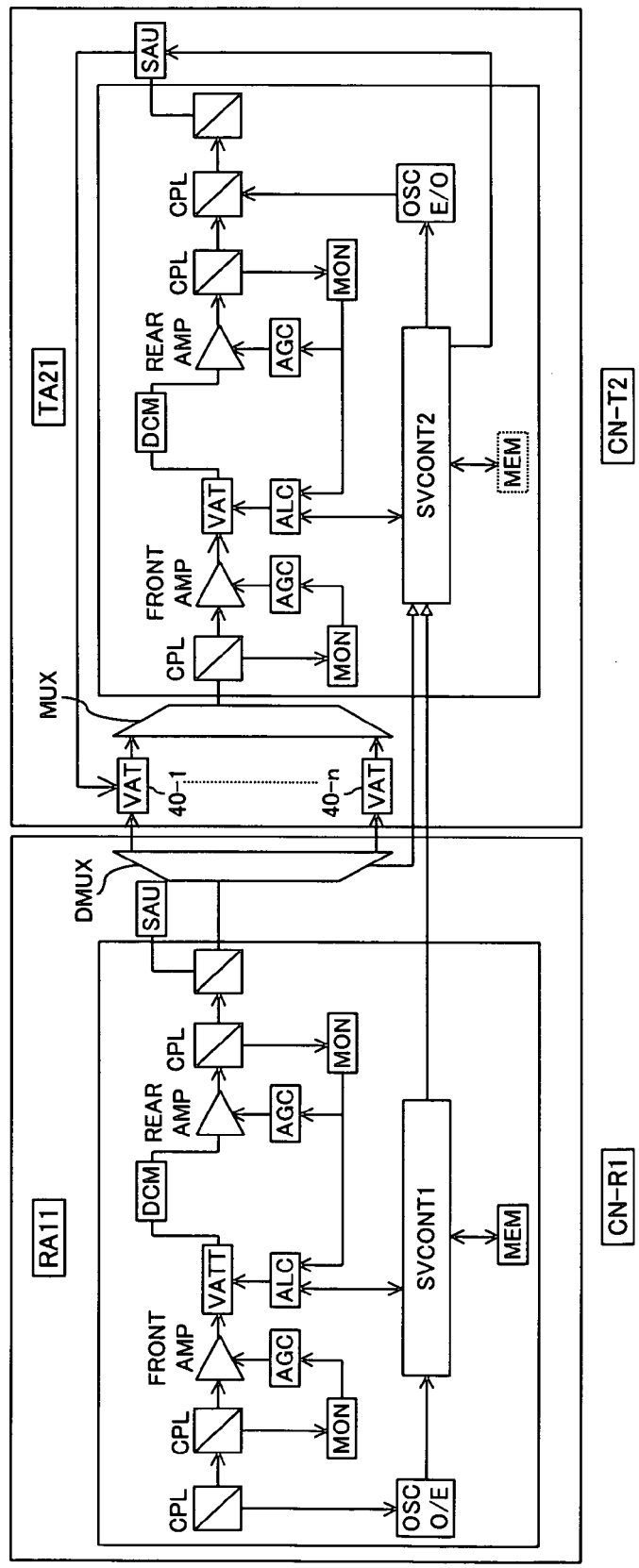
FIG. 10 shows the configuration of the circuit between the CN-R and the CN-T according to an embodiment of the present invention.

FIG. 10 shows the configuration of the circuit between the CN-R and the CN-T according to the embodiment of the present invention.

The reception AMP at the final stage of the upstream WDM system is defined as the RA11 to form the CN-R1 together with the DMUX. The transmission AMP of the downstream WDM is defined as the TA21 to form the CN-T2 together with the VAT, MUX, and SAU.

When the rise of the system is completed, the ALC status information from the upstream system is transmitted to the SVCONT1 through the OSC O/E. The operation status of the RA11 is transmitted to the SVCONT1. In the SVCONT1, the ALC status signal of the entire upstream WDM system is generated according to the ALC status information about the ALC status information RA11 from the upstream system.

At the CN-T2, the rise of the CN-T2 is started according to the change information about the AGC→ALC at the CN-R1. The AGC/ALC information is transmitted from the SVCONT1 to the SVCONT2, and the control to the VAT 40-1 through 40-n in the CN-T2 is performed through the SAU based on the change from the AGC to the ALC.

At the system rise, when the status of the AMP at the CN-R1 is the AGC status, the amount of the attenuation of the VAT at the CN-T2 is expressed by the held value. Immediately after the system rise is started, light is not input to the VAT of the CN-T2, and the VAT is entirely closed. When light is input to the RA11 of the CN-R1 during the system rise, the RA11 starts illuminating and light gradually enters the VAT of the CN-T2. However, since only the information in the AGC status is received from the SVCONT1, the SVCONT2 has the VAT entirely closed with the predetermined preceding value. The RA11 changes to the ALC status, the SVCONT2 first issues an instruction to release the VAT 40-1 through 40-n via the SAU, and the system rise starts at the CN-T2.

The operation at the wavelength expansion is also performed in the similar sequence.

The second problem is solved by calculating and monitoring the OSNR value for each wavelength by each reception AMP of a plurality of P to P WDM systems connected by a compensation node, and transmitting the information to the downstream reception AMP through the CN unit (compensation node unit).

First, the expression of calculating the OSNR when an optical signal passes one amplifier is shown below.

Assume an amplifier n as shown in FIG. 11A. Assuming that the input power is expressed by $Pinsig_{dBm}$, the noise index of the amplifier n by $NF_{dB}$, the energy by $h\nu$, and the normalized bandwidth by $B_0$ (=0.1 nm), the $OSNR_{amp\_dB}$ of the amplifier n is expressed by the following expression.

$$OSNR_{amp\_dB} = Pinsig_{dBm} - NF_{dB} - 10\log(h\nu B_0) = Pinsig_{dBm} - NF_{dB} - (-57.938_{\_dBm}) \quad \text{(math 1)}$$

Next, two amplifiers n−1 and n connected sequentially as shown in FIG. 11B are considered.

Assuming that the OSNRs of the amplifiers n−1 and n are respectively $OSNR_{(n-1)}$, $OSNR_{(n)}$, the $OSNR_{(Total)}$ when the two amplifiers are passed, is calculated as follows.

$$(OSNR_{(Total)})^{-1} = (OSNR_{(n-1)})^{-1} + (OSNR_{(n)})^{-1} \quad \text{(math 2)}$$

Figure 1:
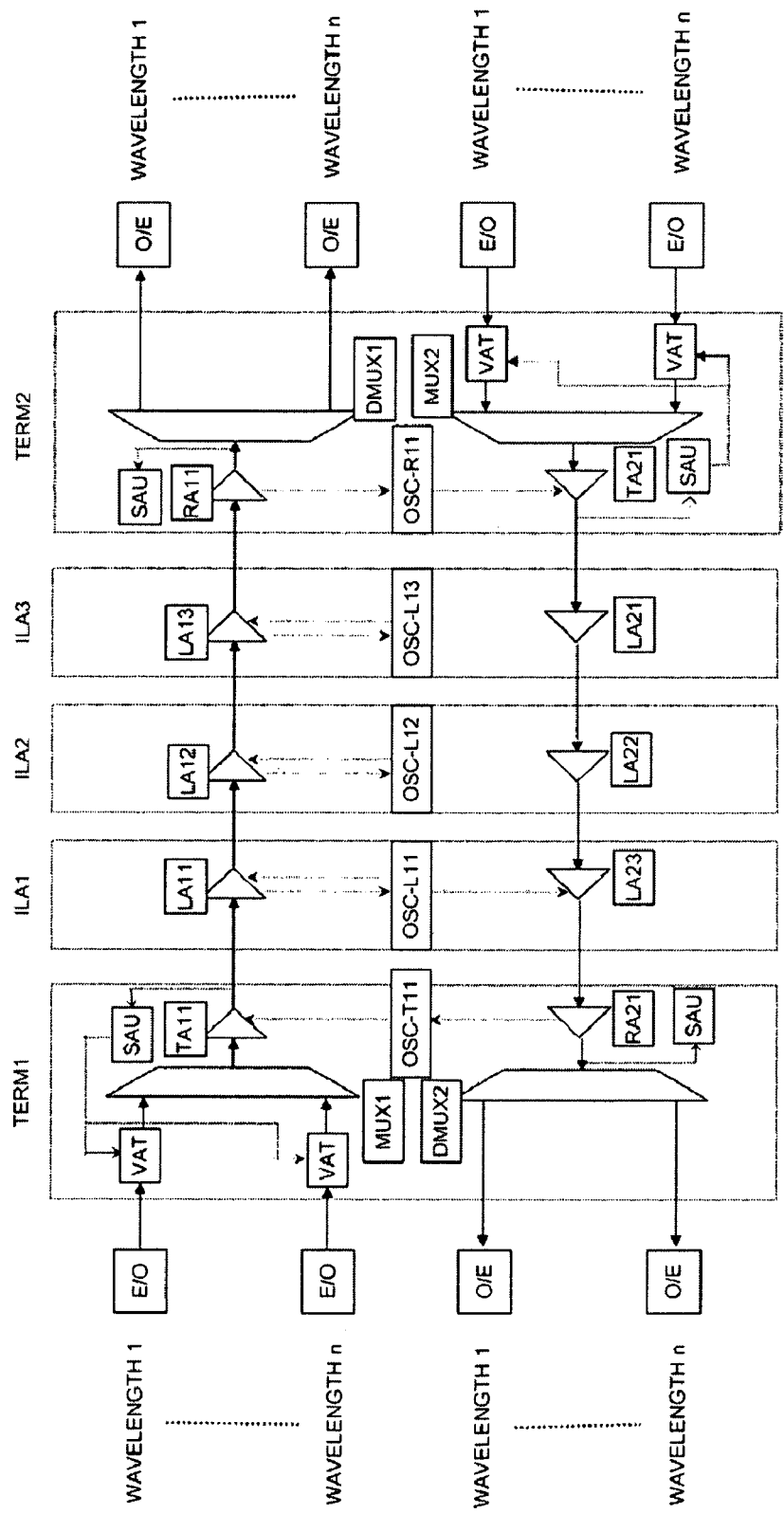
FIG. 1 shows the WDM system of the conventional P to P WDM system.
Figure 2:
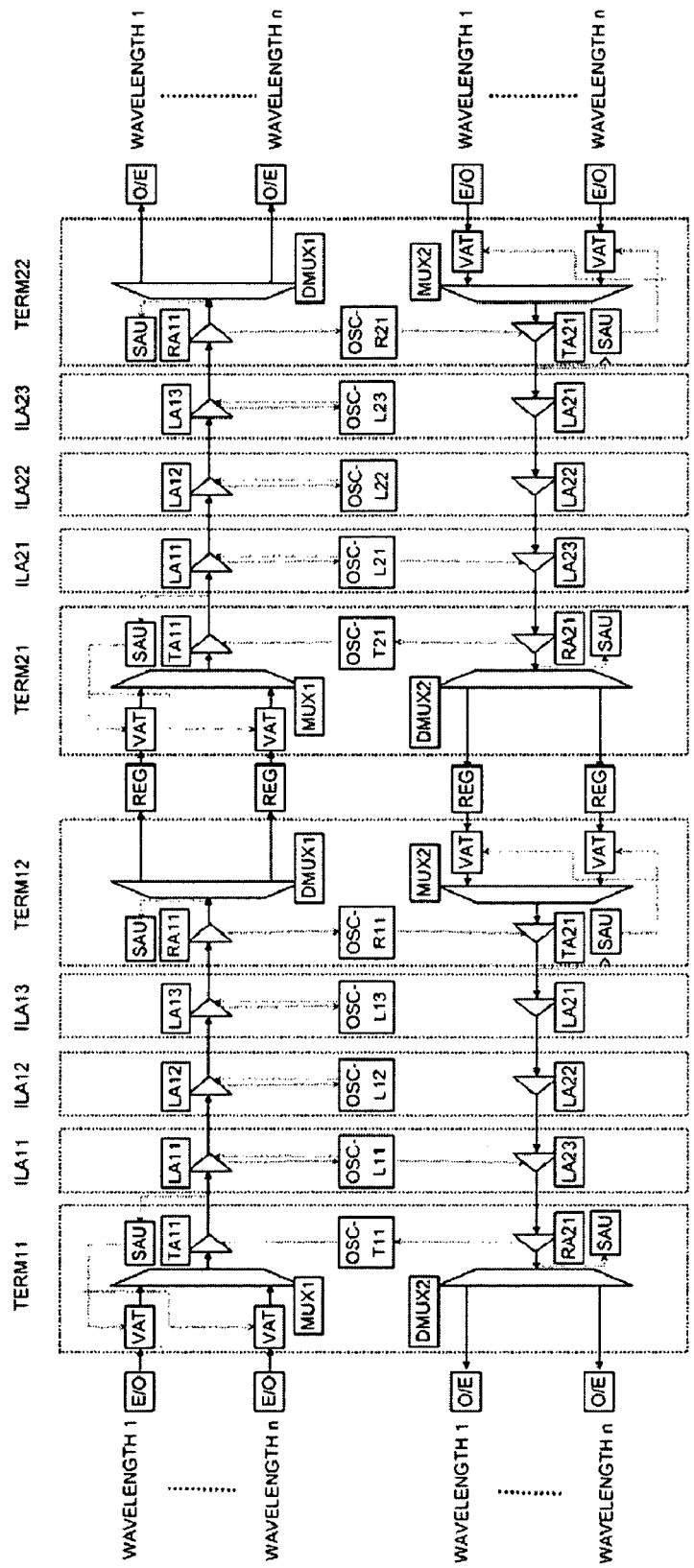
FIG. 2 shows the configuration of the WDM system using a REG unit.
Figure 3:
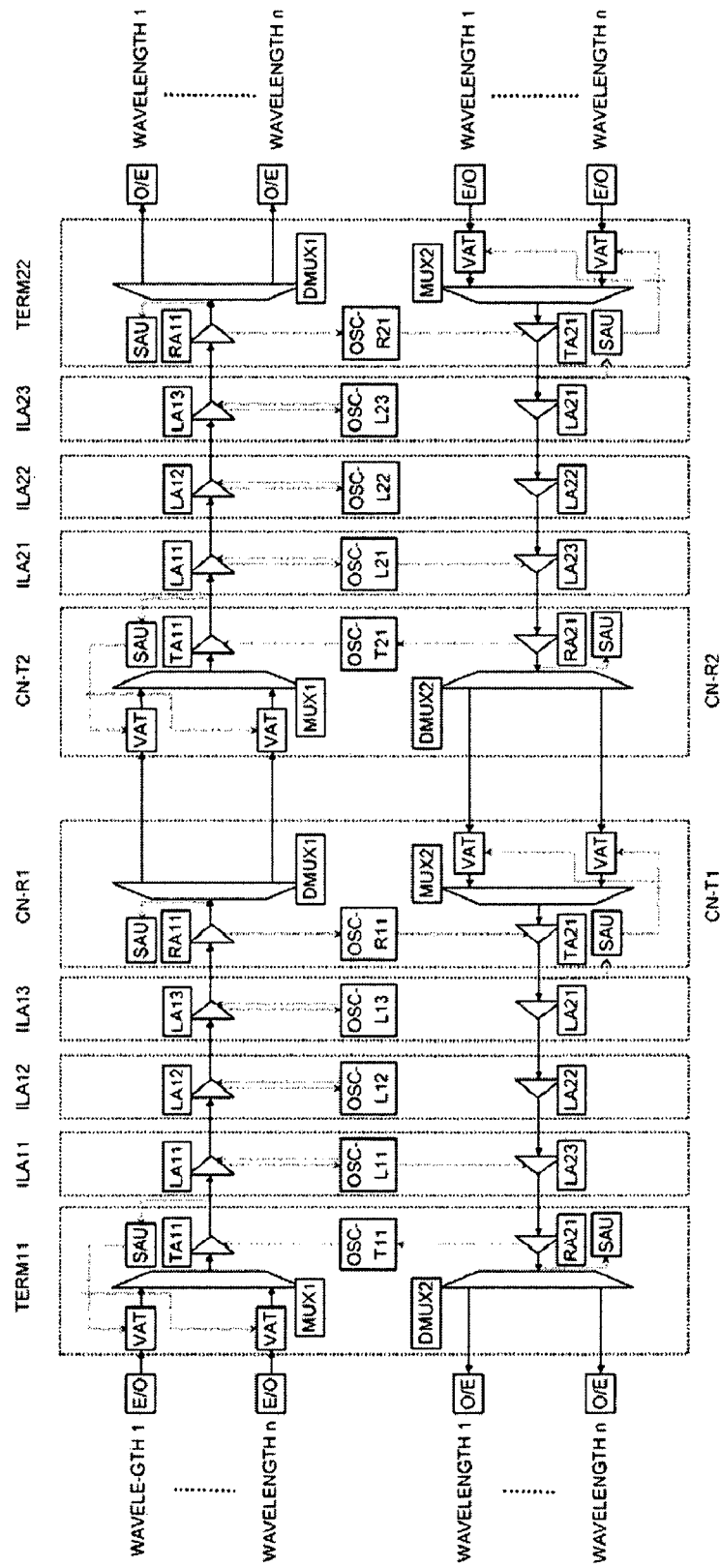
FIG. 3 shows the configuration of the compensation node system.
Figure 4:
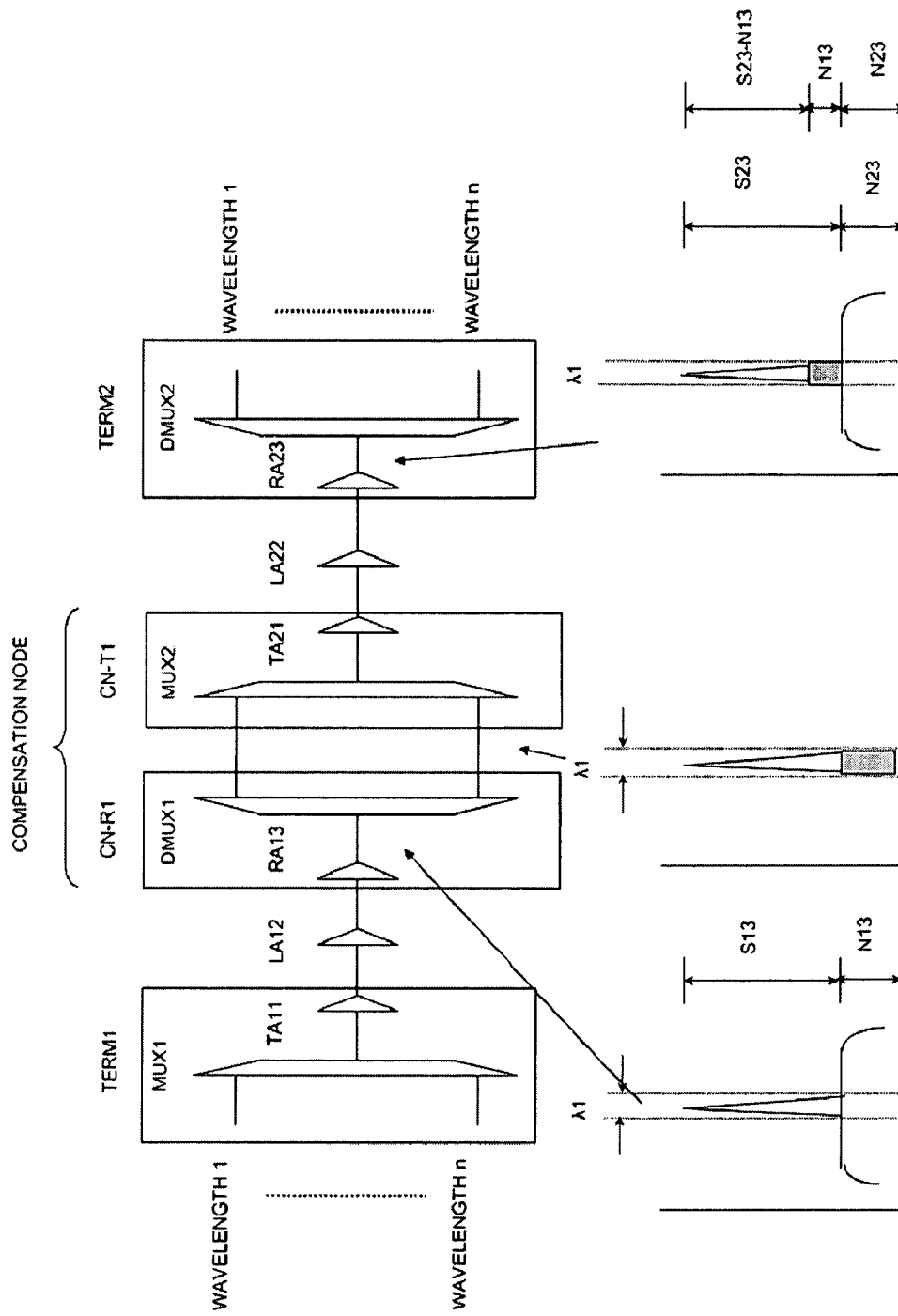
FIG. 4 is an explanatory view showing the deviation of the OSNR value monitored by spinning the compensation nodes from the true OSNR value.
Figure 5:
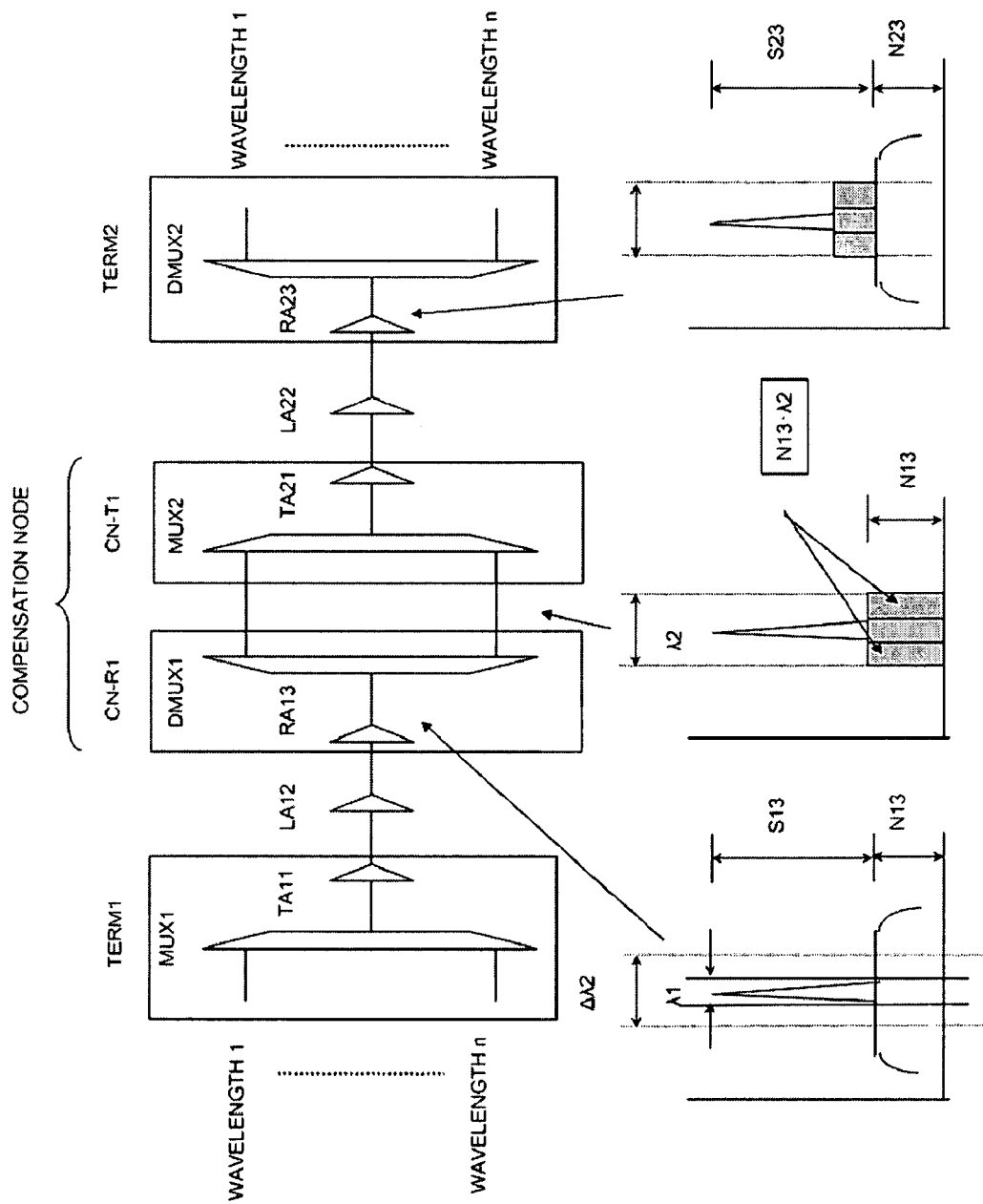
FIG. 5 is an explanatory view showing the outline of the leakage of the ASE in the compensation node.

The equation indicates that the entire OSNR is given as a sum of reciprocals of the OSNRs of each amplifier. Based on the result, the OSNR of the general P to P WDM system shown in FIG. 1 is approximated as follows.

$$OSNR_{(Total)} = (\Sigma_i OSNR_i^{-1})^{-1} \quad \text{(math 3)}$$

where i indicates the number of stages of AMPs.

The $OSNR_{Total\_CN}$ at the final stage when a plurality of WDM sections are connected with the CN configuration is considered.

Since the total OSNR of the reception AMP at the final stage of each WDM section is expressed by (math 3), the following equation similarly holds.

$$OSNR_{Total\_CN} = (\Sigma_i OSNR_{Total}^{-1})^{-1} \quad \text{(math 4)}$$

As indicated by the (math 1), when the signal power of the optical input of each amplifier and the noise index are given, the OSNR of each AMP can be calculated. By the (math 3), the total OSNR in the WDM section can be calculated at the final stage if the OSNR information about each of the involved AMPs is transmitted to the AMP at the final stage. In the WDM section, information is communicated according to an OSC signal, and the total OSNR value at the final stage can be calculated by communicating the OSNR information for each channel in each AMP.

Similarly, in the long-distance WDM system in which a plurality of WDM sections are connected by the CN configuration, if the total OSNR information about each channel in each WDM section can be communicated among the WDM sections through the CN unit, then the final OSNR with this configuration can be calculated.

In the practical system, since the final OSNR value is required to prescribe the optical characteristic at the reception O/E input in one-wave terminal station for wavelength-demultiplexing at the final stage, it is necessary to obtain the total OSNR at least in each WDM section. As it is apparent from the configuration of the P to P WDM system shown in FIG. 1, the output of the reception AMP at the final stage is monitored by the SAU, and the OSNR can be measured. Therefore, the total OSNR at the final stage can be calculated by communicating in each WDM section through the compensation node section the OSNR measurement value at the reception AMP output at the final stage of each WDM section.

The method of transmitting the OSNR information in the compensation node section and the OSC format are described later.

The third problem can be solved by the transmission AMP of the CN-T unit correcting the ASE correction error caused by the transmission ASE if the amount of the ASE transmitting on the DMUX side of the compensation node can be estimated.

With the configuration of the CN unit shown in FIG. 12, the equation for obtaining the value of the ASE correction to the transmission AMP (TA2) with the amount of the leakage ASE generated by the DMUX unit of the CN-R and the amount of ASE generated by the transmission AMP (TA2) taken into account is described below.

First, the method of correcting the degradation of the level of the output signal by the ASE according to the conventional technology is explained.

In the optical amplifier controlled for a constant mode (ALC) of output power, the output power to be monitored includes the total power of the signal light and the ASE light, based on which the amplification rate is controlled as a prescribed value.

Therefore, when there are a small number of wavelengths, the ratio of the signal light power to the total output power is exceedingly low, and the amplification ratio to the signal light is apparently lowered.

As a result, the signal light level is lower than the prescribed value, and the optical SN ratio (OSNR) is lowered, thereby degrading the transmission quality.

As a countermeasure, there is a method of performing control such that the signal light level input to the fiber (that is, a peak level) can be constant by raising the total output power from the prescribed value (Japanese Patent Application Publication No. 2000-232433).

In the description below, the optical amplifier output $P_{total}$ is the sum of the signal light power $P_{sig}$ and the ASE light power $P_{ASE}$.

It is defined as the optical amplifier output $P_{ALC}$ under the ALC.

$$P_{total} = P_{sig} + P_{ASE} = P_{ALC} \quad \text{(math 5)}$$

On the other hand, similarly when the ASE correction is made, the following equation holds.

$$P'_{total} = P'_{sig} + P'_{ASE} \quad \text{(math 6)}$$

By performing the ASE correction, the signal light level $P'_{sig}$ is equal to $P_{ALC}$, therefore, the following equation holds.

$$P'_{sig} = P_{ALC} = P_{sig} + P_{ASE} \quad \text{(math 7)}$$

On the other hand, the signal light power output from the optical amplifier and the ASE optical power per wavelength can be expressed by the following equation with the amplification rate to the signal light defined as G (antilogarithm), the amplifier noise index as NF (antilogarithm), the Planck constant as h (js), the optical frequency as v (Hz), the ASE optical band determined by the filter band in the optical amplifier as $B_{ASE}$ (Hz), and the number of wavelengths as M.

$$\begin{cases} P_{sig} = GP_{sig\_in} \\ P_{ASE} = \dfrac{NFhv(G-1)B_{ASE}}{M} \end{cases} \quad \text{(math 8)}$$

Where $P_{sig\_in}$ indicates input signal light power.

Similarly, if the optical amplification rate is defined as G' after the ASE correction, the following equation holds.

$$P'_{sig} = G'P_{sig\_in} \quad \text{(math 9)}$$

When the equations (math 8) and (math 9) are assigned to the equation (math 7), the following equations are obtained.

$$G'P_{sig\_in} = GP_{sig\_in} + \frac{NFhv(G-1)B_{ASE}}{M} \quad \text{(math 10)}$$

$$\approx G\left(P_{sig\_in} + \frac{NFhvB_{ASE}}{M}\right)(\because G-1 \approx G)$$

$$\therefore \frac{G'}{G} = 1 + \frac{NFhvB_{ASE}}{MP_{sig\_in}} \quad \text{(math 11)}$$

Thus, the ASE correction amount ASECOMP, that is, the addition amount $G_{dB}$ of the amplification rate, is calculated as follows.

$$ASECOMP(dB) = \Delta G_{dB} \quad \text{(math 12)}$$

$$= 10\log\left(\frac{G'}{G}\right)$$

$$= 10\log\left(1 + \frac{NFhvB_{ASE}}{MP_{sig\_in}}\right)$$

Based on the (math 12), the ASE correction value to the transmission amplifier (TA2) is given by the following equation.

$$ASECOMP = 10\log\left(1 + \frac{P_{ASE}(total)}{M \cdot P_{sig}(TA2)}\right)(dB) \quad \text{(math 13)}$$

where M indicates the number of channels in the transmission amplifier (TA2), $P_{sig}$ (TA2) indicates a signal power (mW/ch) of average transmission AMP output per channel, $P_{ASE}$ (total) indicates output ASE power (mW).

As $P_{ASE}$ (total), only the ASE power generated at the transmission AMP has been considered in the conventional technology. On the other hand, in the embodiment of the present invention, the ASE transmitted from the upstream of the compensation node is also considered. That is, the following equation holds.

$$P_{ASE}(\text{total}) = m \cdot P_{ASE}(RA1; \Delta\lambda) + P_{ASE}(TA2; B) \quad \text{(math 14)}$$

where m indicates the number of channels passing through the compensation node, $P_{ASE}(RA1;\Delta\lambda)$ indicates the ASE power (mW) per bandwidth $\Delta\lambda$ transmitted from the upstream of the compensation node and amplified by the transmission amplifier, and $\Delta\lambda$ indicates the bandpass width (nm) of an optical wavelength-demultiplexer forming part of a compensation node. $P_{ASE}(TA2;B)$ indicates the ASE power (mW) in the entire bandwidth B generated in the transmission amplifier (TA2).

$P_{ASE}(RA1;\Delta\lambda)$, and $P_{ASE}(TA2;B)$ can be calculated as follows.

The OSNR output by the reception amplifier (RA2) is calculated as follows based on the definition of the OSNR and that $P_{ASE}(RA1;0.1 \text{ nm})$ is the ASE power (mW) per bandwidth 0.1 nm.

$$OSNR(RA1) = \frac{P_{sig}(RA1)}{P_{ASE}(RA1; 0.1\text{nm})} \quad \text{(math 15)}$$

The equation can be varied as follows for the ASE power per band $\Delta\lambda$.

$$P_{ASE}(RA1; \Delta\lambda) = \frac{P_{sig}(TA2)}{OSNR(RA1)} \cdot \frac{\Delta\lambda}{0.1} \quad \text{(math 16)}$$

Similarly, $P_{ASE}(TA2;B)$ can be calculated as follows.

$$P_{ASE}(TA2; B) = \frac{P_{sig}(TA2)}{OSNR(TA2)} \cdot \frac{B}{0.1} \quad \text{(math 17)}$$

The ASE correction value for the transmission AMP (TA2) can be separately considered as the ASE leaking from the DMUX of the CN unit and the ASE generated by the transmission AMP (TA2) based on the (math 14).

The leakage ASE from the DMUX unit can be calculated when the passing bandwidth of the filter of the MUX/DMUX unit constituting a compensation node, the OSNR at the output of the reception AMP (RA1), and the output power of the transmission AMP (TA2) output are given.

The ASE generated in the transmission AMP (TA2) can be calculated when the OSNR and the output power at the transmission AMP output, and the bandwidth of the transmission AMP (TA2) are given. As shown in FIG. 10, the input/output power of the AMP can be used in monitoring, and can collect information. Since the passband of the filter of the MUX/DMUX unit and the significant bandwidth of the transmission AMP are well known, the memory MEM connected to the SVCONT unit can store data.

The OSNR can be calculated by (math 1) and (math 3). Pinsing can be measured by the input/output monitor function of the AMP, and can be stored in the memory.

The data collected or stored by the reception AMP (RA1) is transmitted from the OSC SVCONT1 to the OSCSVCONT2, and the transmission AMP (TA2) performs calculation.

The information about the number of channels passing through the compensation node by the equation of (math 14) is required. However, since only the setting information about the channel of the pertinent channel can be obtained at the CN-T side, it is necessary to pass the setting present/absent information and the fault information from the CN-R to the CN-T. The information is passed in the WDM section through the OSC ("WCS" indicates the setting present/absent information, and "WCF" indicates the fault information). Since these pieces of information are terminated by the SVCONT1 of the CN-R, the passing channel can be calculated by passing the information from the SVCONT1 to the SVCONT2.

When the problems 1 through 3 are solved, there are two methods of processing information to be transmitted in the compensation node.

One is to complete the process by transmitting information only between the CN-R and the CN-T in the compensation node, and the information such as the above-mentioned AGC/ALC status information, the setting absent/present information and fault information about each wavelength, the input power of the reception AMP (RA1) of the CN-R, the filter band of the MUX/DMUX unit in the compensation node, each AMP noise index NF, etc. is collected and processed by the SVCONT1 and the SVCONT2. Since the total OSNR of each WDM section is used in the leakage ASE light calculation in the compensation node as an OSNR of the reception AMP (RA1) of the CN-R, the transmission is performed between the compensation nodes.

The OSNR required by the reception AMP (RA1) of the CN-R is the OSNR accumulated by all AMPs in the WDM system to which the reception AMP (RA1) belongs. The value is defined as OSNR_tot. It is expressed by (math 3).

On the other hand, to obtain a true OSNR, it is necessary to prepare a value to be accumulated in each WDM section connected by the compensation node. The value to be accumulated is defined as OSNR_cum. It is expressed by (math 4).

According to the embodiment of the present invention, as shown in FIG. 13, OSNR_tot and OSNR_cum are prepared in the OSC format for each wavelength. The method of processing OSNR_tot in the WDM section is explained below by referring to FIG. 1 and FIGS. 7 through 9.

As shown in FIG. 1, the OSC information is transmitted from the transmission AMP (TA11) to the reception AMP (RA11) through the repeater AMP (LA11, LA12, LA13).

In the transmission AMP (TA11), the OSNR value in the transmission AMP (TA11) is input to the OSNR_tot in the OSC information and transmitted to the repeater AMP (LA11) at the next stage by the input power of the transmission AMP and the noise index $NF_{TA11}$ collected by the SVCONT shown in FIG. 7.

In the repeater AMP (LA11), the OSNR value is calculated in the repeater AMP (LA11) based on the input power of the repeater AMP (LA11) and noise index $NF_{LA11}$, and an accumulative OSNR_tot$_{LA11}$ with the OSNR_tot$_{TA11}$ transmitted from the upstream transmission AMP (TA11) by the equation (math 2). The value is transmitted again as the OSC information to the downstream repeater AMP. A similar process is performed in the downstream repeater AMP.

In the reception AMP (RA11), the total OSNR_tot$_{RA11}$ of the WDM system is calculated based on the accumulative OSNR_tot$_{LA1n}$ transmitted from the repeater AMP (LA1n), the input power of the reception AMP (RA11), and a noise index $NF_{RA11}$.

Described below is the method of processing the OSNR_cum of each piece of WDM system data connected through a compensation node.

In the terminal upstream WDM section, the processing is not performed by the transmission AMP and the repeater AMP, but the data is passed through. The repeater AMP inputs the calculated $OSNR\_tot_{RA11}$ as is to the OSNR_cum. The value is passed from the SVCONT1 of the CN-R to the SVCONT2 of the CN-T as shown in FIG. 10. The SVCONT2 transmits the value received from the CN-R to the downstream reception AMP in the OSC format. In each compensation node, a similar process is performed, and the value is transmitted to the reception AMP at the final stage of the WDM system. The calculated OSNR_cum is the final true OSNR value.

In the reception AMP of each WDM section, the degradation of the transmission path for each wavelength is discriminated by preparing an OSNR acceptability discrimination threshold.

As shown in FIG. 13, in an embodiment of the present invention, the additional OSNR information is prepared including OSNR_cum and OSNR_tot as an OSC transmission bit, and 1-bit display per current channel is performed. 40.0 dB through 5.0 dB are required as the respective OSNR display ranges, and the information for display of the width of 35.0 dB in 0.1 step is required. Therefore, a data area of 2 bytes per channel is required. FIG. 13 shows an example of the OSC data constituted by the number of wavelengths of 88. 352 bytes are required in the embodiment of the present invention.

The transmission rate of the OSC information is 1.544 MHz, and it is necessary to prepare a higher transmission rate. The OSC of 155 MHz is also used currently, and it can be expanded.

When the system is actually constituted and the embodiment of the present invention is applied, a long-distance transmission system using the compensation node shown in FIG. 6 can be configured. The device management control information and the optical characteristic information in the upstream WDM system are inherited by a downstream WDM system. In the dwonstream WDM system, a downstream WDM system controls a stable operation based on the inherited data, and can obtain the optimum optical transmission characteristic status by correctly grasping an optical parameter.

Figure 14:
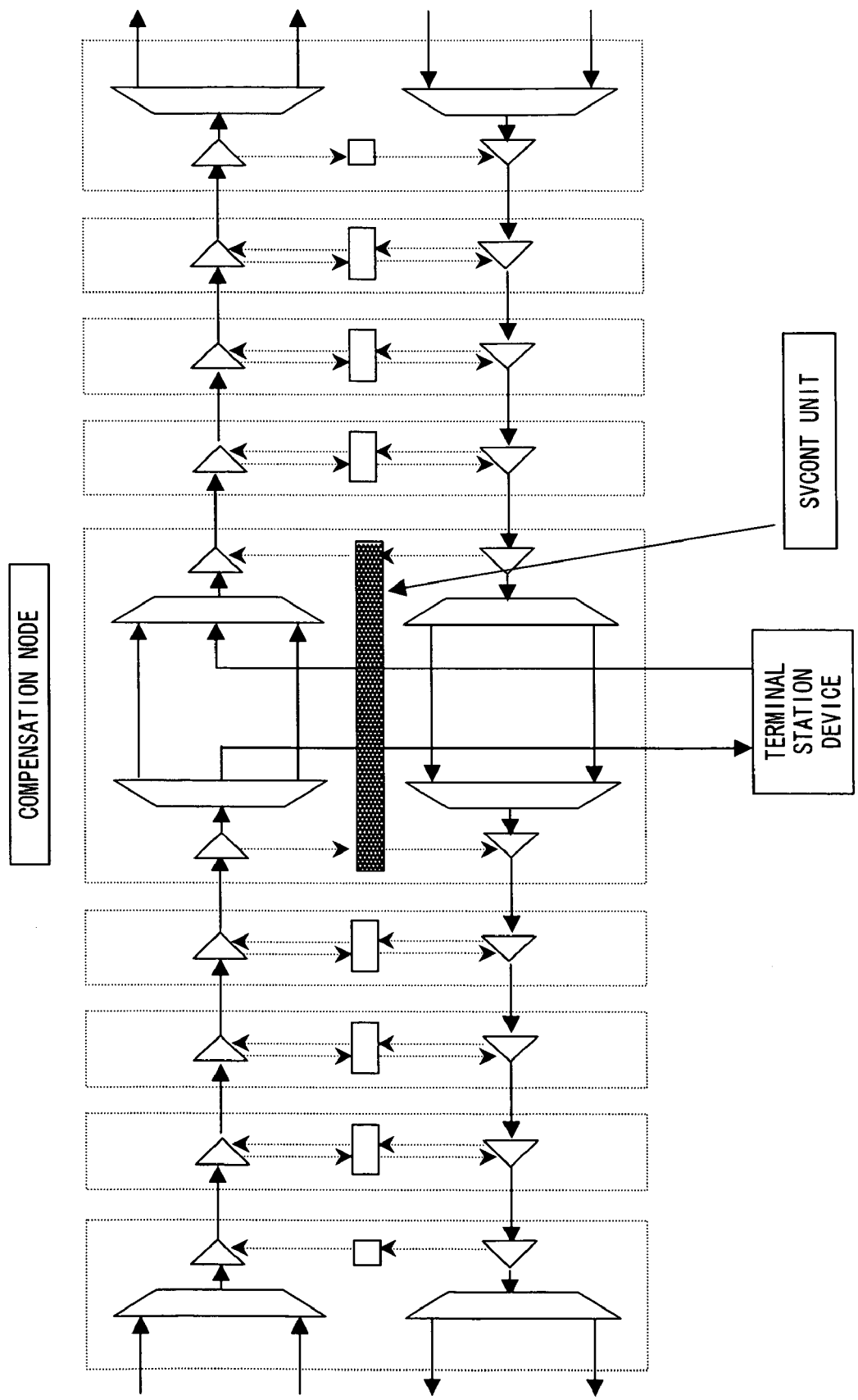
FIG. 14 shows the configuration of the optical add/drop transmission system using a compensation node to which an embodiment of the present invention is applied.

FIG. 14 shows the configuration of an optical add/drop transmission system using a compensation node to which the embodiment of the present invention is applied.

With the configuration, in the compensation node, a signal is dropped and added, but there can be no discrimination between a through channel and an add/drop channel in a compensation node. Therefore, it is necessary to prepare through/add information for the setting information about each wavelength at the CN-T side.

By passing the settings of the through/add information for each channel, the number of through channels is clarified, and the leakage ASE light at the CN-R can be calculated.

When the OSNR of each channel is calculated, the accumulative OSNR of the add/drop channel is cleared, but the OSNR of the added channel can be calculated again according to the through/add setting information.

Figure 15:
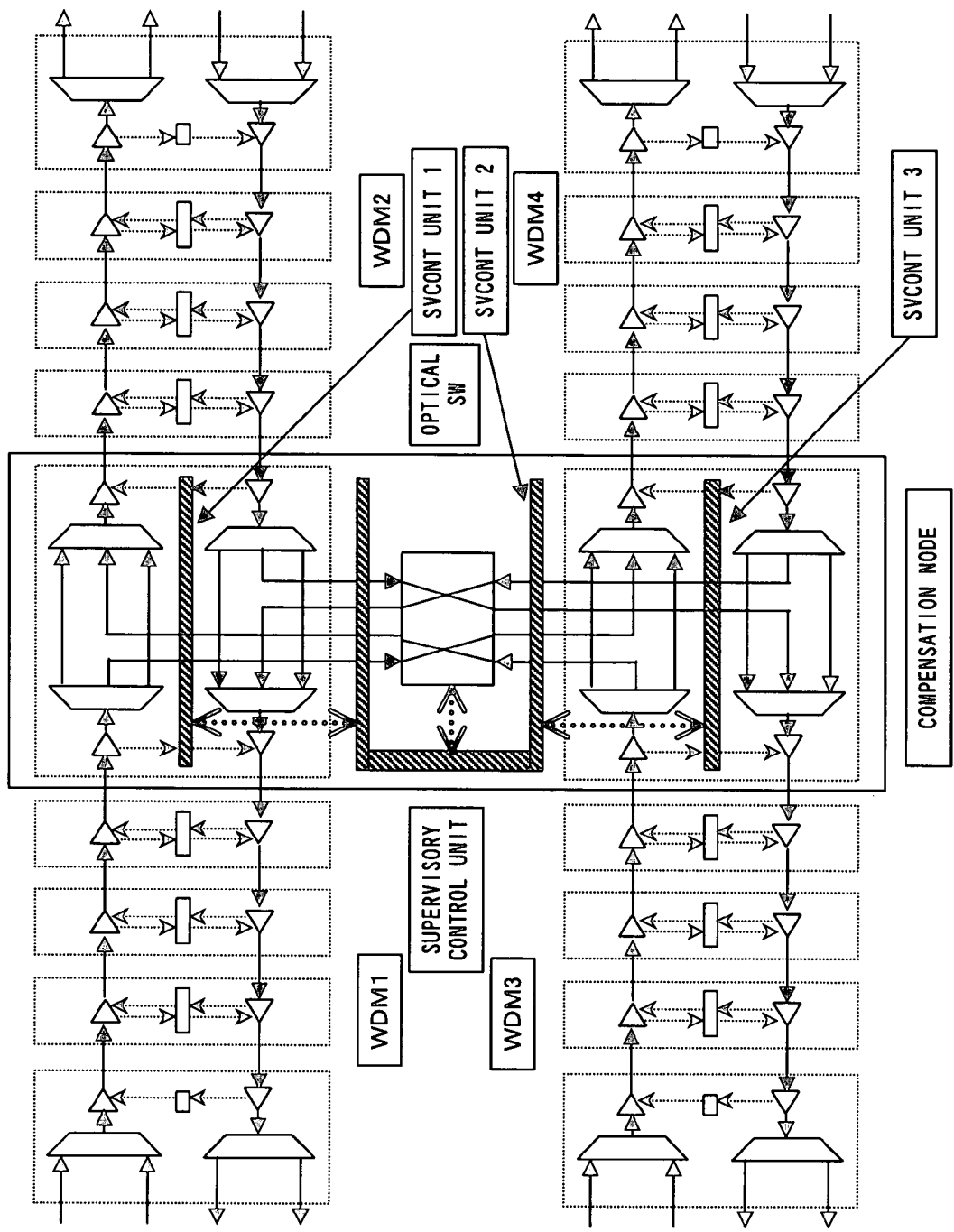
FIG. 15 shows the configuration of the optical cross-connect transmission system as an expansion of the optical add/drop function to which an embodiment of the present invention is applied.

FIG. 15 shows the configuration of the optical cross-connect transmission system whose optical add/drop function is expanded to which the embodiment of the present invention is applied.

With the above-mentioned configuration, the wavelength dropped from one optical add/drop unit is added to the other add/drop unit over an optical switch. Assume that the channel dropped from the CN-R unit of the WDM 1 is added to the CN-T unit of the WDM 4.

When an ASE correction in the WDM 4 is performed, the information about the reception AMP in the CN-R of the WDM 1 is required. Therefore, as shown in FIG. 15, it is necessary to transmit necessary data from the SVCONT unit 1 to the SVCONT unit 3.

It is also necessary to transmit the OSNR_cum of the channel dropped by the CN-R of the WDM 1 to the CN-T of the WDM 4. Thus, when an optically dropped channel from one WDM system is to be added to the WDM system of the other path, it is necessary to transfer the information about a channel to be processed. In this case, it is necessary to indicate an optical cross-connect path. Accordingly, it is necessary to set a cross-connect in the SVCONT unit 2 for processing the cross-connect. Furthermore, information is to be communicated among the SVCONT unit 1, the SVCONT unit 2, and the SVCONT unit 3 to allow the necessary information for each channel to be transmitted as the settings of cross-connect. Thus, the setting information among the optical cross-connect can be smoothly passed, thereby successfully realizing optimization.

FIG. 16 shows the effect of the correction of the leakage ASE in a compensation node.

FIG. 16 shows the amount of correction of the ASE generated only in the TA1 of the CN-T and the amount of correction considered up to the leakage ASE generated in the compensation node. Assuming that there is one wave for a through channel, the output terminal OSNR of the reception AMP (RA1) of the CN-R is 16.0 dB, and the wavelength multiplexer/demultiplexer passband width in the CN-R is 1.0 nm, the through channel includes the amount of leakage ASE of 0.8 dB to be considered. Therefore, it can be recognized that the amount of ASE correction is considerably depleted. According to (math 16), the lower the output terminal OSNR of the reception AMP (RA1) is, and the wider the wavelength multiplexer/demultiplexer passband width in a compensation node is, the higher the leakage ASE amount becomes in the compensation node. Therefore, the correction of the leakage ASE has a higher effect on the system having a lower transmission OSNR and a wider filter band.

According to the embodiment of the present invention, in the optical transmission system including a compensation node, add/drop, and optical cross-connect, a system can be activated in a stable status by transmitting the device management control information and the optical characteristic information among the nodes over the compensation nodes, and the optical characteristic can be optimized from the terminal upstream unit to the terminal downstream unit.

What is claimed is:

1. An optical transmission apparatus, comprising:
a wavelength demultiplexing unit for wavelength-demultiplexing a first wavelength multiplexed light which is transmitted through a first optical transmission path, into a plurality of light signals;
a wavelength multiplexing unit for transmitting to a second optical transmission path a second wavelength-multiplexed light which is produced by multiplexing each of the plurality of light signals which are obtained by demultiplexing; and
a supervisory control unit for causing supervisory control signal information transmitted to the second optical transmission path with the second wavelength-multiplexed light to carry information of the supervisory control signal transmitted through the first optical transmission path with the first wavelength-multiplexed light, wherein
the supervisory control unit calculates an amount of transmitting ASE light from the wavelength-demultiplexing unit to the wavelength-multiplexing unit based on a characteristic of a filter of the wavelength-demultiplexing unit from an optical SN ratio of each wavelength in output of a reception amplifier at a preceding stage of the wavelength demultiplexing unit, a bandwidth of a filter in a wavelength-multiplexing unit and a wavelength demultiplexing unit, and output power of a transmission amplifier of the wavelength-multiplexing unit, and reflects the amount of transmitting ASE light to the supervisory control information transmitted to the second optical path.

2. The optical transmission apparatus according to claim 1, wherein
the supervisory control information transferred by the supervisory control unit includes information data about start up of a device of an optical system composing the first optical transmission path.

3. The optical transmission apparatus according to claim 1, wherein
the supervisory control information transferred by the supervisory control unit to the second optical transmission path includes information data about an optical SN ratio of an optical system composing the first optical transmission path.

4. The optical transmission apparatus according to claim 3, wherein
the supervisory control unit obtains an optical SN ratio of an optical system composing the first optical transmission path from optical SN ratios of each of a plurality of transmission sections of the optical system composing the first optical transmission path.

5. The optical transmission apparatus according to claim 1, wherein
the amount of the ASE light is given by $$P_{ASE} = \frac{P_{sig}}{OSNR} \cdot \frac{\Delta\lambda}{0.1}$$

where $P_{ASE}$ indicates the amount of the ASE light, $P_{sig}$ indicates signal light power, OSNR indicates the optical SN ratio, and $\Delta\lambda$ indicates a passband width of the compensation node device.

6. The optical transmission apparatus according to claim 1, wherein
the optical transmission apparatus has an add/drop function of an optical signal, and information about the added/dropped optical signal is included in the supervisory control information transmitted to the second optical transmission path.

7. The optical transmission apparatus according to claim 1, wherein
the optical transmission apparatus has a cross-connect function of an optical signal, and information about the cross-connected optical signal is included in the supervisory control information transmitted to the second optical transmission path.

8. A system comprising:
a first optical transmission path for transmitting a first wavelength-multiplexed light;
a second optical transmission path for transmitting a second wavelength-multiplexed light; and
an optical transmission unit, including:
  a wavelength demultiplexing unit for wavelength-demultiplexing the first wavelength-multiplexed light which is transmitted through the first optical transmission path, into a plurality of light signals; and
  a wavelength multiplexing unit for transmitting to the second optical transmission path the second wavelength-multiplexed light which is produced by multiplexing each of the plurality of light signals which are obtained by demultiplexing;
a supervisory control unit for causing supervisory control signal information transmitted to the second optical transmission path with the second wavelength-multiplexed light to carry information of the supervisory control signal transmitted through the first optical transmission path with the first wavelength-multiplexed light, wherein
the supervisory control unit calculates an amount of transmitting ASE light from the wavelength-demultiplexing unit to the wavelength-multiplexing unit based on a characteristic of a filter of the wavelength-demultiplexing unit from an optical SN ratio of each wavelength in output of a reception amplifier at a preceding stage of the wavelength demultiplexing unit, a bandwidth of a filter in a wavelength-multiplexing unit and a wavelength demultiplexing unit, and output power of a transmission amplifier of the wavelength-multiplexing unit, and reflects the amount of transmitting ASE light to the supervisory control information transmitted to the second optical path.

9. The system according to claim 8, wherein
the supervisory control information transferred by the supervisory control unit includes information data about start up of a device of an optical system composing the first optical transmission path.

10. The system according to claim 8, wherein
the supervisory control information transferred by the supervisory control unit to the second optical transmission path includes information data about an optical SN ratio of an optical system composing the first optical transmission path.

11. The system according to claim 10, wherein
the supervisory control unit obtains an optical SN ratio of an optical system composing the first optical transmission path from optical SN ratios of each of a plurality of transmission sections of the optical system composing the first optical transmission path.

12. The system according to claim 8, wherein
the amount of the ASE light is given by $$P_{ASE} = \frac{P_{sig}}{OSNR} \cdot \frac{\Delta\lambda}{0.1}$$

where $P_{ASE}$ indicates the amount of the ASE light, $P_{sig}$ indicates signal light power, OSNR indicates the optical SN ratio, and $\Delta\lambda$ indicates a passband width of the compensation node device.

13. The system according to claim 8, wherein
the optical transmission apparatus has an add/drop function of an optical signal, and information about the added/dropped optical signal is included in the supervisory control information transmitted to the second optical transmission path.

14. The system according to claim 8, wherein
the optical transmission apparatus has a cross-connect function of an optical signal, and information about the cross-connected optical signal is included in the supervisory control information transmitted to the second optical transmission path.

15. A optical transmission method, comprising:
- wavelength-demultiplexing a first wavelength-multiplexed light which is transmitted through a first optical transmission path, into a plurality of light signals;
- transmitting to a second optical transmission path a second wavelength-multiplexed light which is produced by multiplexing each of the plurality of light signals which are obtained by demultiplexing;
- causing supervisory control signal information transmitted to the second optical transmission path with the second wavelength-multiplexed light to carry information of the supervisory control signal transmitted through the first optical transmission path with the first wavelength-multiplexed light;
- calculating an amount of transmitting ASE light on the first optical transmission path based on a characteristic of a filter used in the wavelength-demultiplexing from an optical SN ratio of each wavelength in output of a reception amplifier at a preceding stage of the wavelength demultiplexing, a bandwidth of a filter in the transmitting and the wavelength demultiplexing, and output power of a transmission amplifier of the transmitting, and reflects the amount of transmitting ASE light to the supervisory control signal information transmitted to the second optical transmission path.

16. The optical transmission method according to claim 15, wherein
the supervisory control information transferred by the supervisory control unit includes information data about start up of a device of an optical system composing the first optical transmission path.

17. The optical transmission method according to claim 15, wherein
the supervisory control information transferred by the supervisory control unit to the second optical transmission path includes information data about an optical SN ratio of an optical system composing the first optical transmission path.

* * * * *